United States Patent
Buuck et al.

(10) Patent No.: US 6,942,252 B2
(45) Date of Patent: Sep. 13, 2005

(54) SELECTIVELY ATTACHABLE ROAD DEBRIS FLAP/SPLASH GUARD FOR VEHICLES

(76) Inventors: Randy T. Buuck, 2505 Sycamore Beach, Angola, IN (US) 46703; Joseph Ruble, 10331 N. 500 West, Decatur, IN (US) 46733

( * ) Notice: Subject to any disclaimer, the term of this patent is extended or adjusted under 35 U.S.C. 154(b) by 0 days.

(21) Appl. No.: 10/404,481

(22) Filed: Apr. 1, 2003

(65) Prior Publication Data

US 2003/0227168 A1 Dec. 11, 2003

Related U.S. Application Data

(60) Provisional application No. 60/369,699, filed on Apr. 3, 2002.

(51) Int. Cl.[7] ............................................... B62D 25/16
(52) U.S. Cl. ...................... 280/847; 280/851; 280/154
(58) Field of Search .......................... 280/154, 847–851

(56) References Cited

U.S. PATENT DOCUMENTS

| | | | |
|---|---|---|---|
| D192,684 S | 5/1962 | Knowles | |
| 3,058,757 A | 10/1962 | Sullivan | |
| D249,500 S | 9/1978 | Cox | |
| 4,138,130 A | 2/1979 | Pickrell et al. | |
| 4,319,764 A | 3/1982 | Whitaker | |
| 4,487,422 A | 12/1984 | Turunen | |
| 4,966,378 A | 10/1990 | Cook | |
| 5,026,094 A | 6/1991 | Haddox | |
| 5,121,944 A | 6/1992 | Haddox | |
| D328,447 S | 8/1992 | Ahleen | |
| 5,181,734 A | 1/1993 | Brown | |
| 5,316,191 A | 5/1994 | Gibson et al. | |
| 5,582,430 A | 12/1996 | Bauer et al. | |
| 5,593,172 A | 1/1997 | Breslin | |
| 5,727,805 A | 3/1998 | La Roque | |
| 5,833,254 A | 11/1998 | Bucho | |
| 5,938,222 A | 8/1999 | Huang | |
| D415,086 S | 10/1999 | Larkin et al. | |
| 6,076,842 A | 6/2000 | Knoer | |
| 6,179,311 B1 | 1/2001 | Larkin et al. | |
| 6,375,223 B1 * | 4/2002 | Kirckof | 280/851 |
| 6,394,475 B1 * | 5/2002 | Simon | 280/154 |
| 6,485,059 B2 * | 11/2002 | Burnstein | 280/851 |

FOREIGN PATENT DOCUMENTS

GB        2 158 790 A        11/1985

OTHER PUBLICATIONS

Product Brochure—RIGID Hitch Incorporated, 2000, Trailer Hitches, Towing Accessories, Truck Accessories, Trailer Parts.

* cited by examiner

Primary Examiner—Lesley D. Morris
Assistant Examiner—L. Lum
(74) Attorney, Agent, or Firm—Baker & Daniels

(57) ABSTRACT

A selectively attachable road debris flap/splash guard for vehicles which is secured to a component of the vehicle hitch apparatus and which does not acquire access to the entire perimeter of the component of the vehicle hitch apparatus to which it is attached. In one exemplary embodiment, a hanger rail receiver is secured to a component of the hitch apparatus and accommodates a hanger rail positioned therein. The hanger rail extends from the hanger rail receiver, with a debris flap secured to and depending therefrom. Alternative mechanisms are disclosed for securing the hanger rail receiver to the hitch apparatus, none of which require access to the entire perimeter of the hitch component to which the hanger rail receiver is secured. In an alternative embodiment, the hanger rail is directly secured to a component of the hitch apparatus.

20 Claims, 7 Drawing Sheets

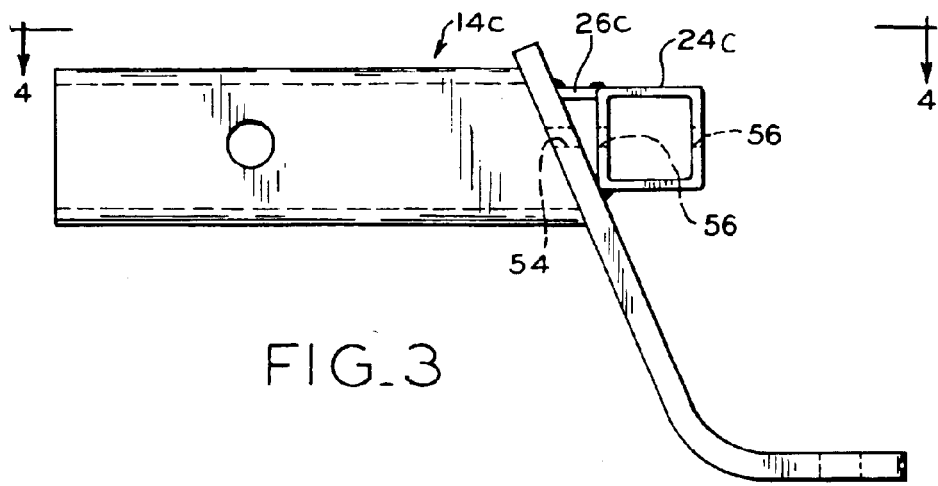
FIG_3
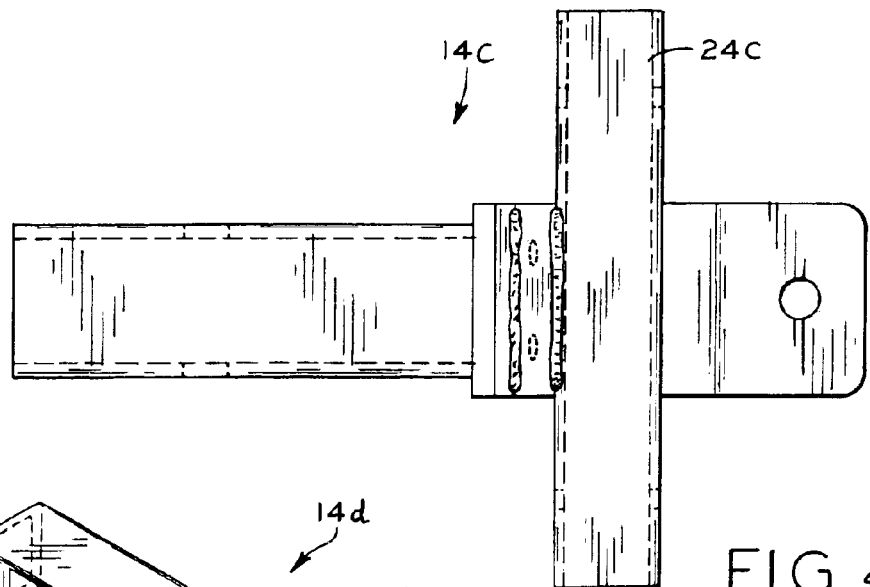
FIG_4
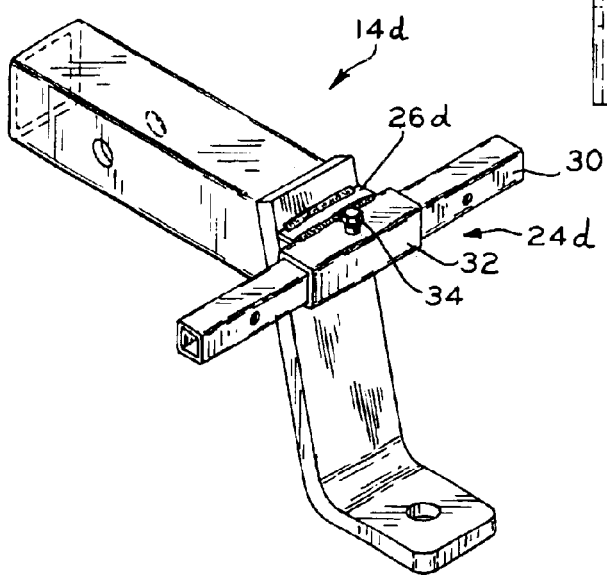
FIG_5

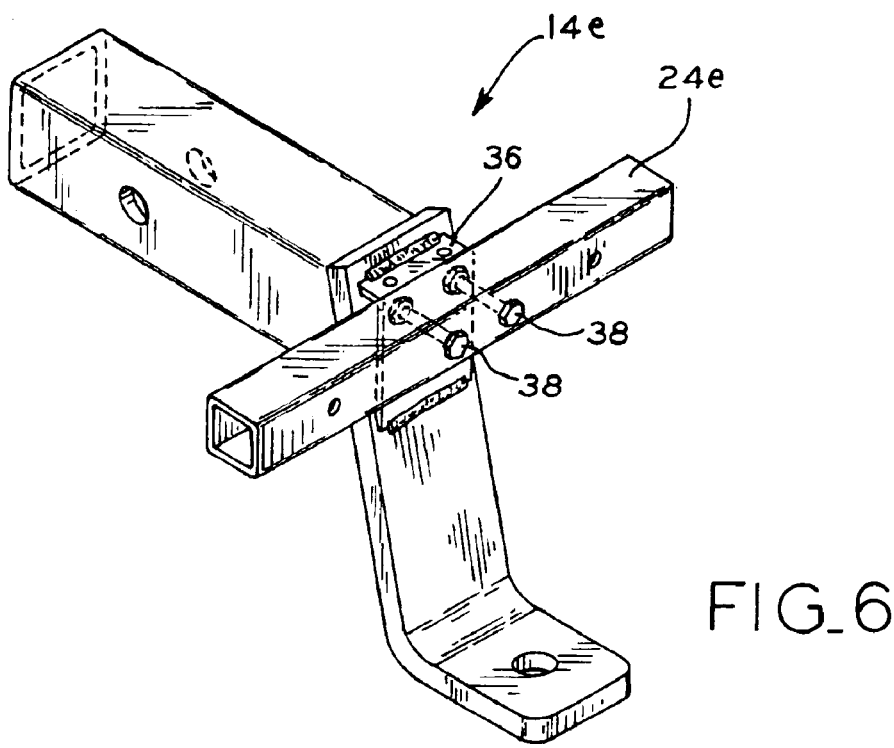
FIG_6
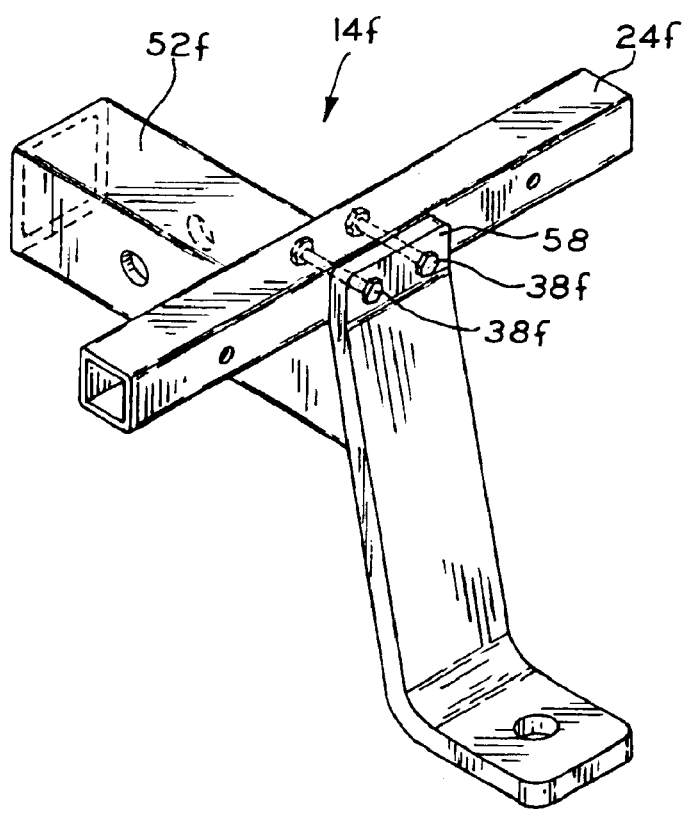
FIG_7

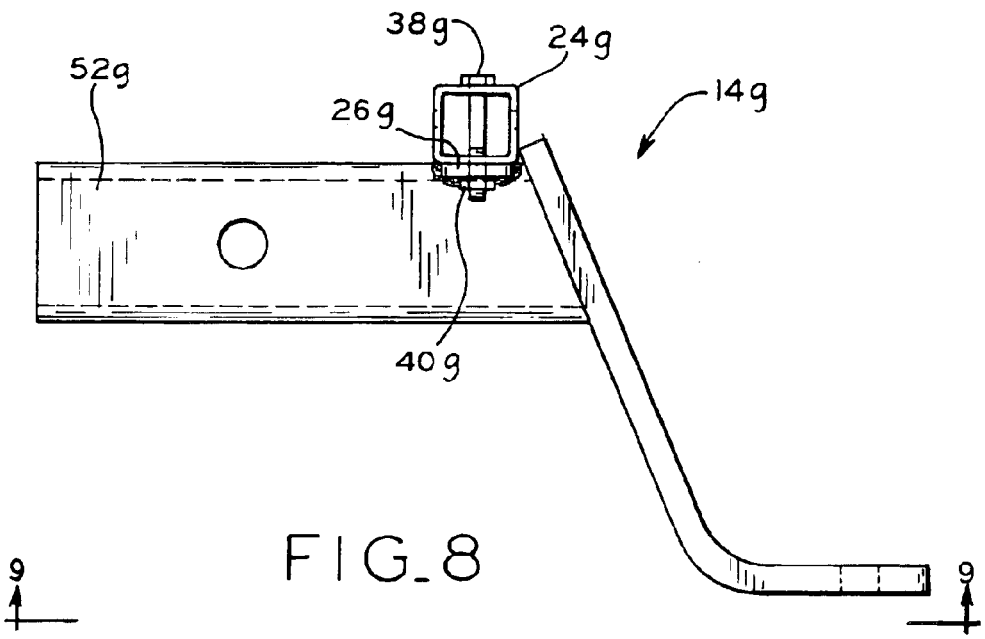
FIG_8
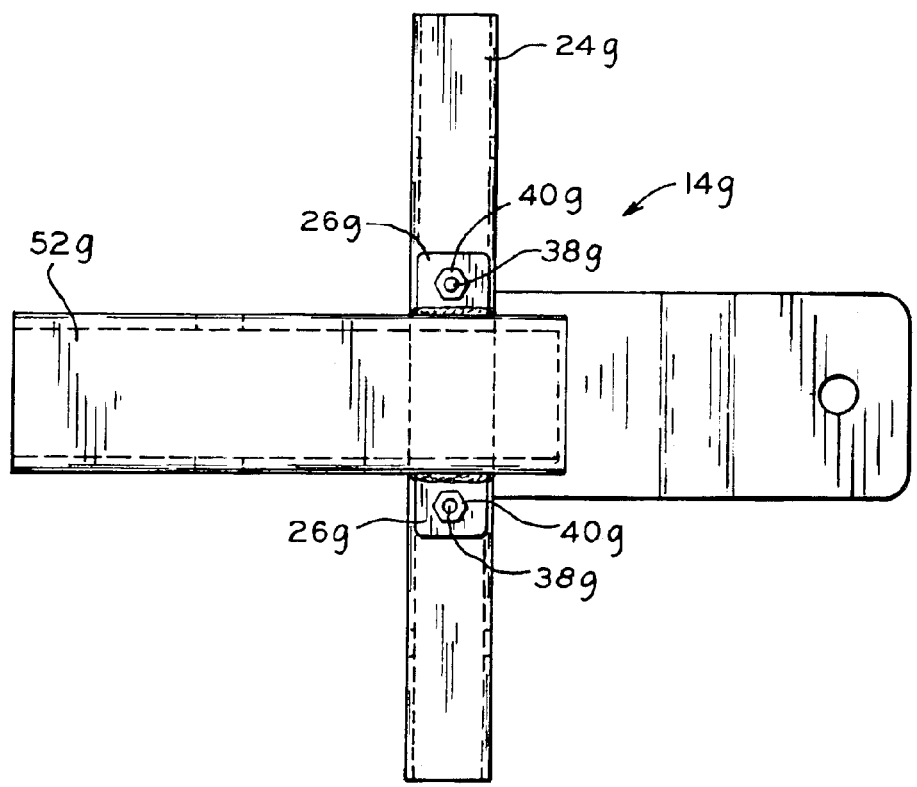
FIG_9

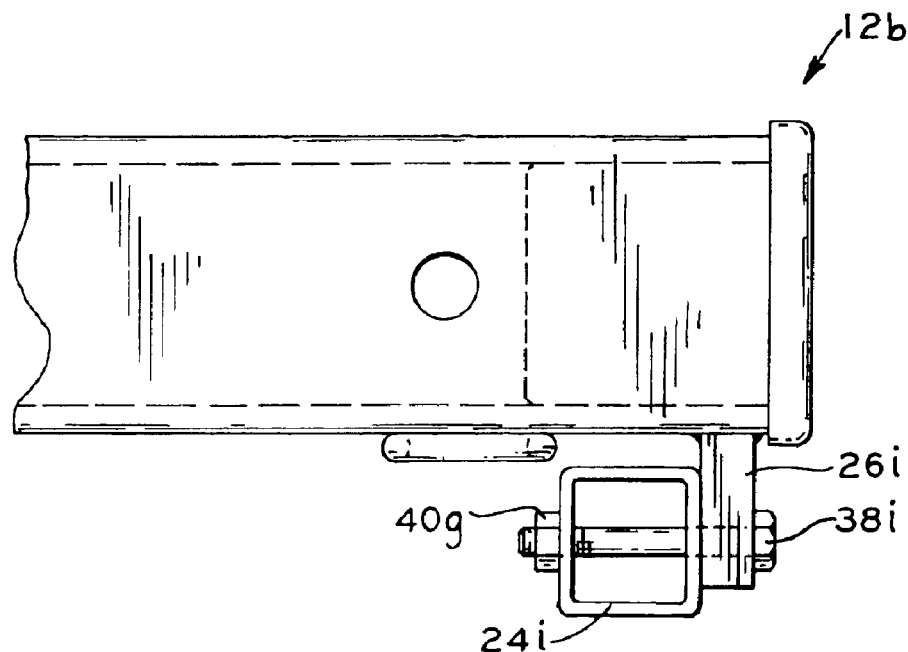
FIG_12
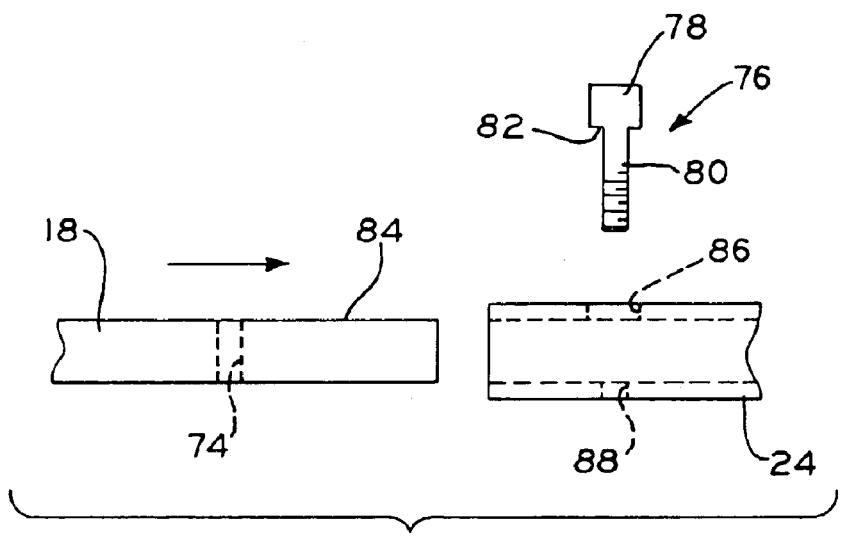
FIG_17

SELECTIVELY ATTACHABLE ROAD DEBRIS FLAP/SPLASH GUARD FOR VEHICLES

CROSS-REFERENCE TO RELATED APPLICATION

This application is related to and claims the benefit under 35 U.S.C. §119 (e) of U.S. Provisional Patent Application Ser. No. 60/369,699, filed Apr. 3, 2002.

BACKGROUND OF THE INVENTION

1. Field of the Invention

The present invention relates to a selectively attachable debris flap/splash guard assembly for a vehicle, and, more particularly, to a selectively attachable debris flap/splash guard assembly secured to a hitch component of the vehicle without requiring access to the entire perimeter of the hitch component.

2. Description of the Related Art

Hitch equipped vehicles with hitch receivers are typically utilized to tow various items including, e.g., trailers, campers, and the like. Recreational equipment such as, e.g., snowmobiles, motorcycles, or the like may be placed atop a trailer for transportation to and from a recreational site. Items towed behind a vehicle including, items placed atop a trailer may be damaged due to, e.g., ice buildup occurring from moisture splashed from the road surface by the tow vehicle which freezes on various portions of the towed items, the weight of which may cause damage to the towed items. Ice formed on towed items may preclude use of the towed items until the ice can be removed. Additionally, road debris may be thrown by the tires of the tow vehicle during travel and directed against items being towed, potentially causing damage thereto. Conventional debris flaps/splash guards, attached to the towing vehicle typically do not prevent this damage due, e.g., to the size and placement of the conventional debris flap/splash guards.

Attempts have been made to provide additional debris flap/splash guard structures attached proximate the rear bumper of a tow vehicle. The additional debris flap/splash guards may be larger in size than conventional debris flap/splash guards associated with vehicles and therefore prove more effective in preventing damage to items towed by the vehicle. Prior attempts at providing additional debris flap/splash guards to a towing vehicle have utilized a mechanism having a collar adapted to fit about either the drawbar of a ball mount to be inserted into the hitch receiver connected to the towing vehicle or to fit about the hitch receiver itself. Collar structures of this type do not have universal applicability, as various ball mount/receiver combinations have differing geometries which may or may not accommodate placement of a collar about either the ball mount or the hitch receiver when the ball mount is operably positioned within the corresponding hitch receiver attached to a tow vehicle. Moreover, the structure of the tow vehicle, including, e.g., the rear bumper structure may preclude placement of a collar about the hitch receiver or ball mount.

What is needed in the art is a selectively attachable debris flap universally applicable to various towing vehicles.

SUMMARY OF THE INVENTION

The present invention provides a selectively attachable splash guard/debris flap for use with a tow vehicle which is secured to a component of the vehicle hitch apparatus and which does not require access to the entire perimeter of the component of the vehicle hitch apparatus to which it is attached. In one exemplary embodiment, the selectively attachable splash guard/debris flap of the present invention includes a component integral with a component of the tow vehicle hitch, e.g., the ball mount or the hitch receiver. In this embodiment, the size and placement of the splash guard/debris flap component integrally formed with the hitch component does not interfere with normal placement of the ball mount into the hitch receiver.

The invention in one form thereof, comprises a ball mount having one or more hanger rail receivers non-releasably secured thereto. The hanger rail receiver(s) is adapted to accommodate and support hanger rails having debris flaps fixed thereto. The hanger rail receiver(s) is positioned on the ball mount so that it does not interfere with connection of the ball mount to the hitch receiver, nor does it interfere with any structure of the tow vehicle, e.g., the rear bumper thereof.

The invention, in another form thereof, comprises a hitch receiver having one or more hanger rail receivers non-releasably secured thereto. The hanger rail receiver(s) is adapted to accommodate and support hanger rails having debris flaps fixed thereto. The hanger rail receiver (s) is positioned on the hitch receiver so that it does not interfere with connection of the ball mount to the hitch receiver, nor does it interfere with any structure of the tow vehicle, e.g., the rear bumper thereof.

The invention, in yet another form thereof, comprises a vehicle hitch apparatus and a debris flap for selective securement to the vehicle hitch apparatus. In this embodiment of the present invention, a vehicle hitch apparatus including a vehicle mounted hitch component and a ball mount has a hanger rail receiver non-releasably secured thereto. A hanger rail is selectively securable to the hanger rail receiver and extends therefrom. A debris flap is secured to the hanger rail and depends therefrom.

The invention, in another form thereof, comprises a vehicle hitch apparatus and a debris flap for selective securement to the vehicle hitch apparatus. This form of the present invention includes a vehicle hitch apparatus including a vehicle mounted hitch component having a substantially square cross-section, a ball mount and a drawbar extending from the ball mount and having a substantially square cross-section. A hanger rail receiver is secured to a single side of one of the vehicle mounted hitch component and the drawbar. A hanger rail is selectively securable to the hanger rail receiver to extend therefrom. A debris flap is secured to the hanger rail and depends therefrom.

The invention, in a further form thereof, comprises a vehicle hitch apparatus and a debris flap for selective securement to the vehicle hitch apparatus. This form of the present invention includes a vehicle hitch apparatus including a vehicle mounted hitch receiver having a substantially square cross-section including first, second, third, and fourth sides; a ball mount; and a drawbar extending from the ball mount and including first, second, third, and fourth sides. This form of the present invention further includes the hanger rail receiver and securing means for securing the hanger rail receiver to one of the first side of the hitch receiver and the first side of the drawbar, without requiring access to at least one of the second, third, and fourth sides of the vehicle hitch component to which the hanger rail receiver is secured. The hanger rail is selectively securable to the hanger rail receiver to extend therefrom and a debris flap is secured to the hanger rail and depends therefrom.

The invention, in yet a further form thereof, comprises a vehicle hitch apparatus and a debris flap for selective securement to the vehicle hitch apparatus. This form of the present invention includes a vehicle hitch apparatus including a vehicle mounted hitch component, a ball mount, and a drawbar extending from the ball mount and including a face opposite the drawbar. In this form of the present invention, a hanger rail receiver is secured to the face of the drawbar. A hanger rail is selectively securable to the hanger rail receiver and extends therefrom and a debris flap is secured to the hanger rail and depends therefrom.

An advantage of the present invention is the ability to provide a selectively attachable debris flap/splash guard system which is universally applicable to a variety of tow vehicles and which does not require removal of the ball mount from the hitch receiver to enable attachment of the mud flaps to the hitch structure.

Another advantage of the present invention is the ability to provide a selectively attachable splash guard/debris flap which is securable to a component of a vehicle hitch apparatus without requiring access to the entire perimeter of the component of the vehicle hitch apparatus to which it is attached.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 3 is a side plan view of a third embodiment ball mount of the present invention;

FIG. 4 is a top plan view thereof;

FIG. 5 is a perspective view of a fourth embodiment ball mount of the present invention having a ball mount connector secured to the ball mount, the ball mount connector having a set screw operatively associated therewith whereby an extension connector can traverse the interior of the ball mount connector and be secured thereto via the aforementioned set screw;

FIG. 6 is a perspective view of a fifth embodiment ball mount of the present invention;

FIG. 7 is a perspective view of a sixth embodiment ball mount of the present invention;

FIG. 8 is a side plan view of a seventh embodiment ball mount of the present invention;

FIG. 9 is a bottom plan view thereof;

FIG. 12 is a side plan view of a second embodiment hitch receiver of the present invention;

FIG. 17 is a partial plan view of a hanger rail receiver tube and debris flap hanger rail in accordance with the present invention.

Figure 1:
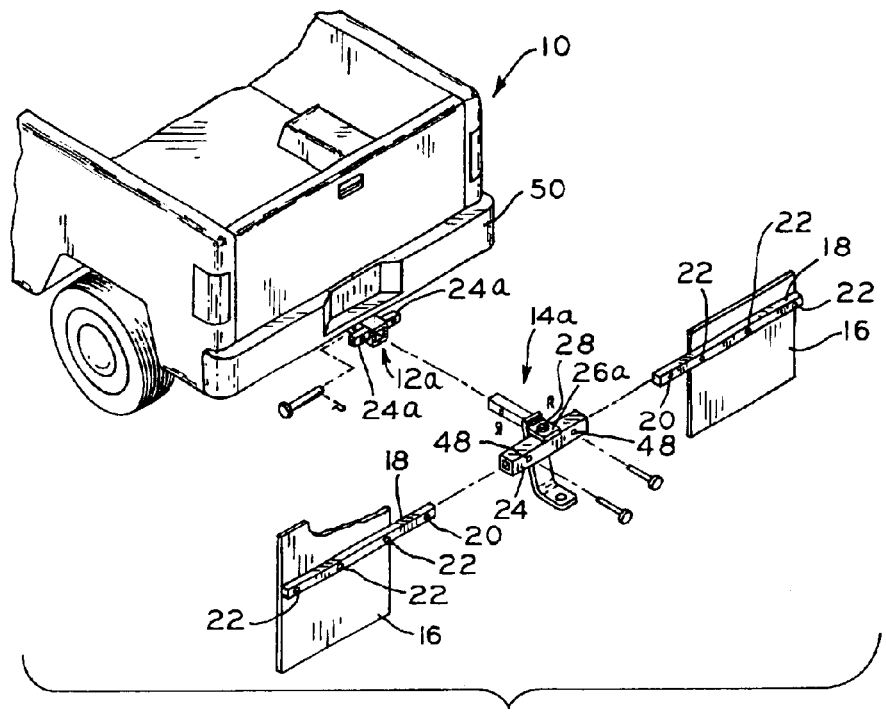
FIG. 1 is a perspective view illustrating two alternative embodiments of the present invention, including a first embodiment in which a portion of the debris flap/splash guard assembly of the present invention is fixed to the hitch receiver of a hitch assembly, and a second embodiment in which a portion of the debris flap/splash guard assembly of the present invention is fixed to the ball mount of a hitch assembly.

Corresponding reference characters indicate corresponding parts throughout the several views. Although the drawings represent embodiments of the present invention, the drawings are not necessarily to scale and certain features may be exaggerated to better illustrate and explain the present invention. The exemplifications set out herein illustrate embodiments of the invention, and such exemplifications are not to be construed as limiting the scope of the invention in any manner.

DETAILED DESCRIPTION OF THE INVENTION

FIG. 1 illustrates ball mount 14a having hanger rail receiver tube 24 fixed thereto. Ball mount 14a is securable to hitch receiver 12a via, e.g., a pin and cotter key arrangement as illustrated in FIG. 1. Ball mount 14a includes tab connector 26a fixed thereto via, e.g., one or more welds. Tab connector 26a includes a central aperture through which bolt 28 is positioned. Hanger rail receiver tube 24 includes a similarly positioned central aperture through both the top and bottom wall thereof. To assemble ball mount 14a, the central apertures of tab connector 26a and hanger rail receiver tube 24 are aligned and bolt 28 is positioned therethrough, with a nut being secured to the distal end thereof to affix hanger rail receiver tube 24 to ball mount 14a via tab connector 26a. As illustrated in FIG. 1, hanger rail receiver tube 24 includes a hollow interior sized to accommodate placement of debris flap hanger rails 18 therein. In an alternative embodiment, hanger rail receiver tube 24 is a solid member which, in use, is positioned within a hollow debris flap hanger rail.

Debris flap hanger rails 18 include connection apertures 20 alignable with corresponding apertures 48 formed in the front and rear walls of hanger rail receiver tube 24. To secure debris flap hanger rails 18 to hanger rail receiver tube 24, debris flap hanger rails 18 are positioned within hanger rail receiver tube 24 with connection apertures 20 of hanger rails 18 aligned with corresponding apertures 48 of hanger rail receiver tube 24 so that a fastener may be positioned through apertures 20, 48 to secure debris flap hanger rails 18 to hanger rail receiver tube 24. One acceptable device for securing debris flap hanger rails 18 to hanger rail receiver tube 24 is a pin and cotter key combination as illustrated in FIG. 1. In an alternative embodiment, a threaded pin having an enlarged head is utilized to secure debris flap hanger rails 18 to hanger rail receiver tube 24. In this embodiment, aperture 48 formed through opposing sides of hanger rail receiver tube 24 includes an enlarged end formed in one side of hanger rail receiver tube 24. The enlarged end of aperture 48 of this embodiment is adapted to receive the enlarged end of the threaded pin, with the threaded end of the pin protruding from the opposite end of aperture 48 to receive a female threaded fastener such as a bolt or wing nut. In one exemplary embodiment, a retaining element can be utilized to retain a wing nut used to secure hanger rail 18 to receiver tube 24 in fixed position to resist loosening thereof. As illustrated in FIG. 1, debris flap 16 may include a curved upper surface to provide greater coverage at the ends of bumper 50. If a curved upper surface is used in conjunction with debris flap 16, debris flap 16 can extend beyond the end of bumper 50 and effectively provide greater coverage. Debris flap 16 is, in one exemplary embodiment, sized to provide coverage along bumper 50 from hitch receiver 12 to the outermost extent of bumper 50. The curved upper surface of debris flap 16 illustrated in FIG. 1 also provides an aesthetically pleasing line to the top surface of debris flap 16. In one exemplary embodiment, the curved upper surface of debris flap 16 can match the curvature at an end of bumper 50.

Generally, hanger rails 18 are tubular members having a hollow interior. With this in mind, connection apertures 20 are formed in the front and rear walls of hanger rails 18. However, if hanger rails 18 are formed as solid rails, then connection apertures 20 will, of course, traverse the entire depth thereof. Throughout the remainder of this document, numerous alternative embodiments having one or more hanger rail receiver tubes connected to either a hitch receiver or ball mount will be illustrated and described. Debris flap hanger rails 18 will be secured to the hanger rail receiver tubes of these alternative embodiments in the same manner described above with respect to hanger rail receive tube 24 of ball mount 14a. With this in mind, securement of hanger rail 18 to these various alternative hanger rail receiver tubes will not be described for the sake of brevity. Moreover, while the hanger rails and hanger rail receiver tubes of the exemplary embodiments described herein have a square cross section, alternative geometries, including round or various polygonal geometries, may be utilized.

Ball mount 14a illustrated in FIG. 1 is adaptable for use with any tow vehicle having a hitch receiver for receiving a ball mount therein because hanger rail receiver tube 24 is affixed to a rearwardly facing portion of ball mount 14a, i.e., a portion facing away from the tow vehicle, and, therefore, hanger rail receiver tube 24 will not interfere with placement of ball mount 14a in the hitch receiver.

FIG. 1 further illustrates a tow vehicle, i.e., truck 10 including hitch receiver 12a having hanger rail receiver tubes 24a fixed to opposing sides thereof. It is contemplated that hanger rail receiver tubes 24a will be welded to hitch receiver 12a, however, any well known mechanisms for securing one metallic component to another may be utilized to secure hanger rail receiver tubes 24a to hitch receiver 12a. Hanger rail receiver tubes 24a are sized to accommodate placement of debris flap hanger rails 18 therein. As illustrated in FIG. 1, debris flap hanger rails 18 include debris flaps 16 secured thereto via fasteners 22. Fasteners 22 can be, e.g., bolt and nut combinations.

Hitch receiver 12a illustrated in FIG. 1 is particularly adaptable to situations in which the top or bottom portions of hitch receiver 12a are not accessible because of the configuration of hitch receiver 12a with respect to truck 10, e.g., hitch receiver 12 may be fixed to truck 10 whereby the top portion of hitch receiver 12a abuts a lower portion of rear bumper 50. In such an arrangement, the collar configuration of the prior art could not be positioned about hitch receiver 12a.

Figure 2:
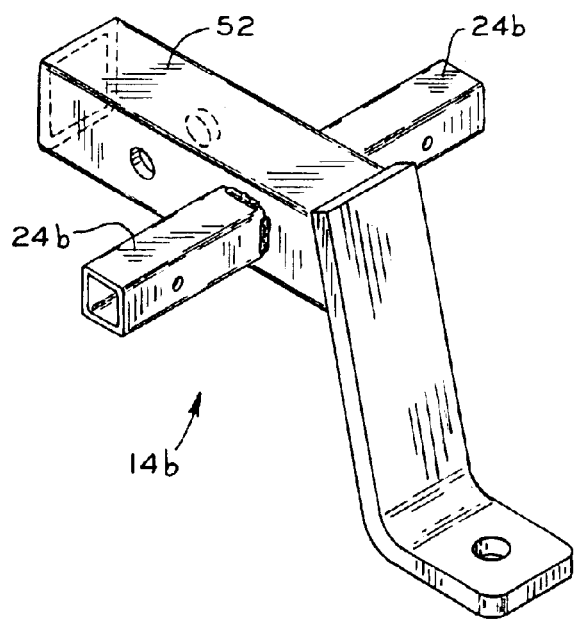
FIG. 2 is a perspective view of a second embodiment ball mount of the present invention including a pair of hanger rail receiver tubes fixed thereto.

FIG. 2 illustrates a second embodiment ball mount 14b of the present invention. Ball mount 14b includes a pair of hanger rail receiver tubes 24b secured to opposing sides of drawbar 52. In the embodiment illustrated in FIG. 2, hanger rail receiver tubes 24b are welded to drawbar 52.

Ball mount 14b illustrated in FIG. 2 is particularly useful in situations in which a portion of drawbar 52 protrudes from the associated hitch receiver when ball mount 14b is secured thereto. Moreover, ball mount 14b illustrated in FIG. 2 is useful in situations in which vehicle structure including, e.g., the rear bumper prohibits access to either or both of the top and bottom surfaces of drawbar 52 when ball mount 14b is secured in a hitch receiver.

FIGS. 3 and 4 illustrate ball mount 14c in accordance with an alternative embodiment of the present invention. As illustrated in FIGS. 3 and 4, ball mount 14c includes hanger rail receiver tube 24c secured thereto. As illustrated in FIG. 3, a corner of hanger rail receiver tube 24c is welded to ball mount 14c, while an adjacent corner of hanger rail receiver tube 24c is welded to tab connector 26c, with tab connector 26c further being welded to ball mount 14c. As illustrated in FIG. 3, ball mount 14c may further include tapped aperture 54 aligned with lag bolt apertures 56 in the front and rear walls of hanger rail receiver tube 24c. If apertures 54 and 56 are formed in ball mount 14c and hanger rail receiver tube 24c, then a lag bolt may be utilized to further secure hanger rail receiver tube 24c to ball mount 14c. In such an arrangement, a lag bolt traverses lag bolt apertures 56 and is thereafter engaged with tapped aperture 54. Lag bolt apertures 56 and tapped aperture 54 are optional additions to the embodiment illustrated in FIGS. 3 and 4. Multiple cooperating lag bolt apertures and tapped apertures may be utilized to accommodate a plurality of lag bolts to secure hanger rail receiver tube 24c to ball mount 14c. In embodiments utilizing a lag bolt to secure hanger rail receiver tube 24c to ball mount 14c, tab connector 26c may not be required, and hanger rail receiver tube 24c will not need to be welded to ball mount 14c.

FIG. 5 illustrates a further alternative embodiment in which ball mount connector 32 is secured to ball mount 14d via tab connector 26d, with tab connector 26d being welded to both ball mount connector 32 and ball mount 14d. Ball mount connector 32 may also be welded to ball mount 14d directly, e.g., at a lower corner of ball mount connector 32. In the embodiment illustrated in FIG. 5, ball mount connector 32 includes set screw 34 positioned in a central aperture formed in a top wall thereof. Extension connector 30 is positioned within ball mount connector 32 and secured thereto via set screw 34. In the embodiment illustrated in FIG. 5, ball mount connector 32 and extension connector 30 combine to form hanger rail receiver tube 24d.

FIG. 6 illustrates another alternative embodiment in which hanger rail receiver tube 24e is positioned on a rearwardly facing portion of ball mount 14e. In the embodiment illustrated in FIG. 6, angle connector 36 is interposed between hanger rail receiver tube 24e and a front face of ball mount 14e. Angle connector 36 is welded or otherwise secured to ball mount 14e, and hanger rail receiver tube 24e is bolted to angle connector 36 via bolts 38. Bolts 38 traverse apertures in the front and back faces of hanger rail receiver tube 24 as well as corresponding apertures in angle connector 36 before nuts are tightened thereon. The alternative embodiments illustrated in FIGS. 3–6 provide a similar advantage as ball mount 14a illustrated in FIG. 1, i.e., universal applicability.

FIG. 7 illustrates an alternative embodiment of the present invention in which ball mount 14f includes upwardly extending tab 58. In this embodiment, upwardly extending tab 58 includes a pair of apertures accommodating bolts 38f. The front and rear side walls of hanger rail receiver tube 24f includes similarly configured apertures to accommodate bolts 38f. To assemble the embodiment illustrated in FIG. 7, hanger rail receiver tube 24f is positioned atop drawbar 52f, whereby the apertures in the front and rear side walls of hanger rail receiver tube 24f are aligned with the apertures formed in upwardly extending tab 58 so that bolts 38f may traverse the apertures in upwardly extending tab 58 as well as the corresponding apertures in hanger rail receiver tube 24f to secure hanger rail receiver tube 24f to ball mount 14f.

Ball mount 14f illustrated in FIG. 7 is advantageous in ball mount/hitch receiver combinations in which a portion of drawbar 52f protrudes from the associated hitch receiver when ball mount 14f is operatively positioned therein and in which the sides and bottom of drawbar 52f are not accessible, precluding the use of, e.g., a collar surrounding drawbar 52f.

FIGS. 8 and 9 illustrate ball mount 14g having hanger rail receiver tube 24g secured thereto. Similar to the embodiment illustrated in FIG. 7, hanger rail receiver tube 24g is placed in abutting relationship with the top wall of drawbar 52g. In the embodiment illustrated in FIGS. 8 and 9, ball mount 14g does not include an upwardly extending tab as in FIG. 7. With this in mind, tab connectors 26g are secured to opposing sides of drawbar 52g via, e.g., welds. Tab connectors 26g include central apertures through which bolts 38g may be positioned to secure hanger rail receiver tube 24g thereto. The top and bottom walls of hanger rail receiver tube 24g include similarly oriented apertures through which bolts 38g may pass to allow for securement of hanger rail receiver tube 24g to ball mount 14g via tab connectors 26g. As illustrated in FIG. 9, nuts 40g are secured to bolts 38g to securely affix hanger rail receiver tube 24g to ball mount 14g via tab connectors 26g. In an alternative embodiment, a tab connector having a similar width to drawbar 52g may be welded to the top of drawbar 52g and transversely oriented with respect thereto. In this embodiment, tab connectors 26g illustrated in FIGS. 8 and 9 are unnecessary and the aforementioned alternative embodiment tab connector connected to the top of drawbar 52g will include one or more apertures through which bolts 38g may pass to connect hanger rail receiver tube 24g to ball mount 14g via the tab connector. In this alternative embodiment, the front and rear walls of hanger rail receiver tube 24g will include apertures aligned with apertures in the tab connector to allow bolts 38g to be utilized to connect hanger rail receiver tube 24g to the aforementioned alternative embodiment tab connector.

While hanger rail receiver tube 24g illustrated in FIGS. 8 and 9 is illustrated as a one piece tube connected to the top of drawbar 52g, it is contemplated that a pair of hanger rail receiver tubes may be utilized, whereby tab connectors 26g may be welded at any position on the opposing sides of drawbar 52g, with the pair of hanger rail receiver tubes being positioned at various heights along the opposing sides of drawbar 52g.

Figure 10:
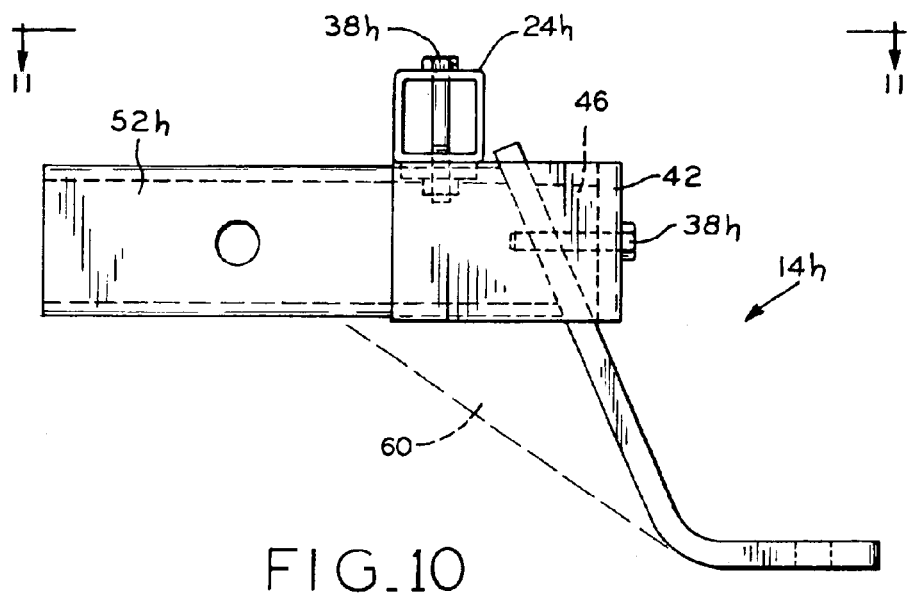
FIG. 10 is a side plan view of an eighth embodiment ball mount of the present invention.
Figure 11:
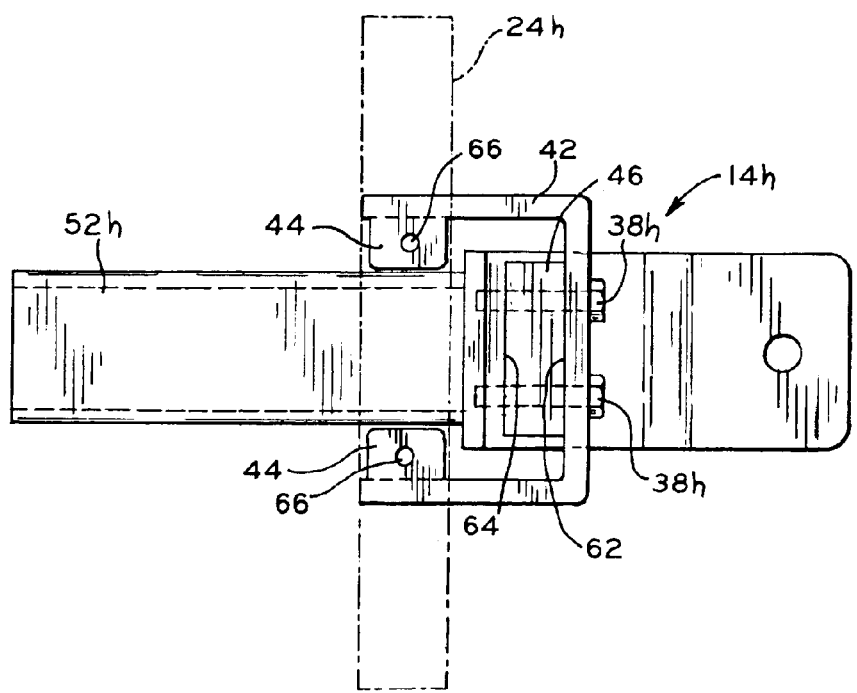
FIG. 11 is a top plan view thereof.

FIGS. 10 and 11 illustrate ball mount 14h having hanger rail receiver tube 24h secured thereto. In the embodiment illustrated in FIGS. 10 and 11, U-shaped connector 42 is bolted to ball mount 14h, with wedge 46 interposed therebetween. Wedge 46 include front face 62 and rear face 64. Front face 62 is flush with U-shaped connector 42, while rear face 64 is flush with ball mount 14h. Bolts 38h traverse apertures in U-shaped connector 42, aligned apertures in wedge 46 and are fixably secured in tapped apertures formed in ball mount 14h to effect fixation of U-shaped connector 42 to ball mount 14h. As illustrated in FIG. 11, U-shaped connector 42 includes connection tabs 44 useful in securing hanger rail receiver tube 24h thereto. Connection tabs 44 include apertures 66 through which bolts 38h' (only one of which is illustrated in FIG. 10) may be positioned to secure hanger rail receiver tube 24h to ball mount 14h. This embodiment is particularly advantageous in situations in which the bottom of drawbar 52h is not accessible, e.g., when gusset 60 is provided as a part of ball mount 14h.

FIG. 12 illustrates an alternative embodiment hitch receiver 12b having hanger rail receiver tube 24i secured thereto. As illustrated in FIG. 12, tab connector 26i is welded to a bottom surface of hitch receiver 12b and includes an aperture through which bolt 38i may be positioned to secure hanger rail receiver tube 24i thereto. Hitch receiver 12b is particularly useful in vehicles in which the top or sides of the hitch receiver are not accessible.

Figure 13:
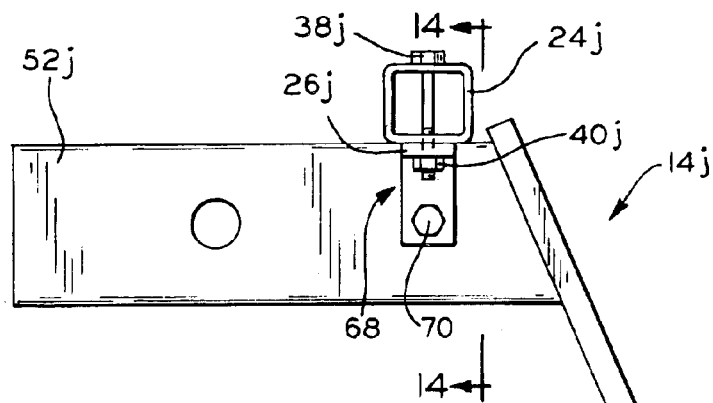
FIG. 13 is a side plan view of a ninth embodiment ball mount of the present invention.
Figure 14:
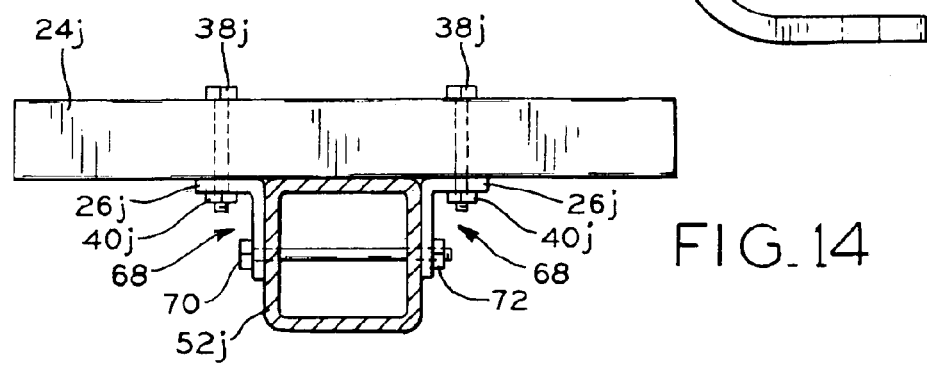
FIG. 14 is a sectional view thereof taken along line 14—14 of FIG. 13.

FIGS. 13 and 14 illustrate ball mount 14j having hanger rail receiver tube 24j secured thereto. Similar to the embodiment illustrated in FIGS. 8 and 9, hanger rail receiver tube 24j is placed in abutting relationship with the top wall of drawbar 52j. In the embodiment illustrated in FIGS. 13 and 14, tab connectors 24j are formed by a leg of angle brackets 68. Angle brackets 68 are secured to drawbar 52j via bolt 70 and nut 72 as illustrated in FIG. 14. In all other respects, the embodiment of FIGS. 13 and 14 is identical to the embodiment illustrated in FIGS. 8 and 9.

Figure 15:
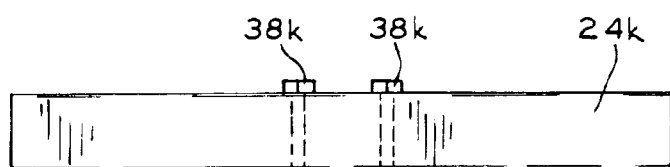
FIG. 15 is a sectional view of a tenth embodiment ball mount of the present invention.

FIG. 15 illustrates an embodiment in which a pair of bolts 38k are utilized to directly secure hanger rail receiver tube 24k to drawbar 52k. In this embodiment, drawbar 52k includes a pair of apertures through the top and bottom walls thereof as illustrated in FIG. 15.

Figure 16:
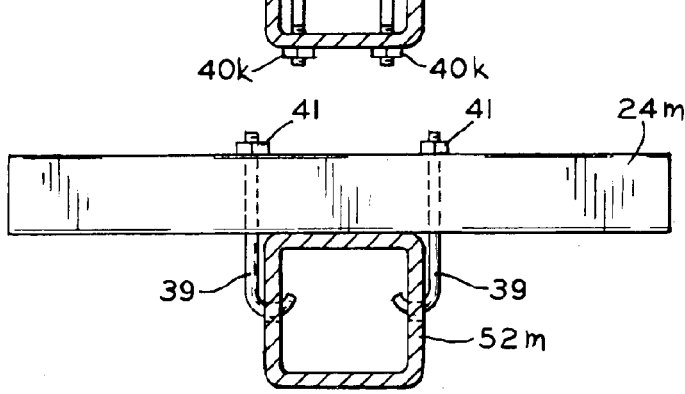
FIG. 16 is a sectional view of an eleventh embodiment ball mount of the present invention.

FIG. 16 illustrates yet another alternative embodiment in which the side walls of drawbar 52m include apertures into which the heads of J-shaped bolts 39 can be positioned. The threaded ends of J-shaped bolts 39 are positioned through apertures formed in hanger rail receiver 24m and nuts 41 are secured thereto to affect securement of hanger rail receiver 24m to drawbar 52m.

FIG. 17 illustrates debris flap hanger rail 18 prior to insertion into hanger rail receiver tube 24. Hanger rail receiver tube 24 illustrated in FIG. 17 can be any of the hanger rail receiver tubes described above. FIG. 17 illustrates an embodiment in which bolt 76 is vertically inserted through hanger rail receiver tube 24 and debris flap hanger rail 18 to secure debris flap hanger rail 18 within hanger rail receiver tube 24. While alternative embodiments of the present invention are illustrated with a horizontally oriented pin or bolt used to secure a hanger rail to a hanger rail receiver tube, the vertical orientation illustrated in FIG. 17 may be utilized with any of the above described embodiments of the present invention. As illustrated in FIG. 17, bolt 56 includes enlarged head 78 and threaded shaft 80. Enlarged head 78 forms a flange 82. In use, bolt 76 traverses head aperture 86 formed in hanger rail receiver tube 24, thereafter traverses bolt aperture 74 of hanger rail 18, and finally shaft aperture 88 of hanger rail receiver tube 24. As illustrated in FIG. 17, bolt aperture 74 and shaft aperture 88 are smaller in size than head aperture 86. Bolt aperture 74 and shaft aperture 88 are sized to accommodate shaft 80 of bolt 76, whereas head aperture 86 is sized to accommodate enlarged head 78 of bolt 76. With enlarged head 78 traversing head aperture 86, flange 82 contacts upper surface 84 of hanger rail 18. When a wing nut or other securing device is threadedly secured to threaded shaft 80 of bolt 76, flange 82 applies force to upper surface 84 of hanger rail 18 and acts to level hanger rail 18 relative to hanger rail receiver tube 24. If a wing nut is used, a securing mechanism may extend from enlarged head 78 to the wing nut and engage the wing nut to prevent rotation thereof.

Advantageously, the components of the selectively attachable road debris flash/splash guard of the present invention may be formed from stainless steel or other corrosion resistant materials.

What is claimed is:

1. In combination, a vehicle hitch apparatus and a debris flap for selective securement to the vehicle hitch apparatus, comprising:
 a vehicle hitch apparatus;
 a hanger rail receiver;
 a tab extending from vehicle said hitch apparatus;
 a fastener for securing said hanger rail receiver to said tab;
 a hanger rail selectively securable to said hanger rail receiver and extending therefrom; and
 a debris flap secured to said hanger rail and depending therefrom.

2. The combination of claim 1, wherein said vehicle hitch apparatus comprises:
 a vehicle mounted hitch component;
 a ball mount; and
 a drawbar extending from said ball mount, wherein said tab extends from said drawbar.

3. The combination of claim 2, wherein said drawbar includes a first side facing a vehicle and a second side not facing the vehicle, wherein said tab extends from said second side of said drawbar.

4. The combination of claim 2, further comprising a second tab, said tab and said second tab extending from opposite sides of said drawbar.

5. The combination of claim 2, wherein said tab is welded to said drawbar.

6. The combination of claim 2, wherein said tab is bolted to said drawbar.

7. The combination of claim 1, wherein said vehicle hitch apparatus comprises:
 a vehicle mounted hitch component;
 a ball mount; and
 a drawbar extending from said ball mount, wherein said tab extends from said ball mount.

8. The combination of claim 7, wherein said tab extends from a face of said ball mount opposite said drawbar.

9. The combination of claim 7, wherein said tab is welded to said ball mount.

10. The combination of claim 7, wherein said tab is bolted to said ball mount.

11. The combination of claim 1, wherein said vehicle hitch apparatus comprises:
 a vehicle mounted hitch component;
 a ball mount; and
 a drawbar extending from said ball mount, wherein said tab extends from said vehicle mounted hitch component.

12. The combination of claim 11, wherein said tab is welded to said vehicle mounted hitch component.

13. The combination of claim 11, wherein said tab is bolted to said vehicle mounted hitch component.

14. The combination of claim 1, wherein said tab comprises an angle bracket.

15. In combination, a vehicle hitch apparatus and a debris flap for selective securement to the vehicle hitch apparatus, comprising:
 a vehicle hitch apparatus, comprising:
  a vehicle mounted hitch component;
  a ball mount; and
  a drawbar extending from said ball mount;
 a hanger rail receiver,
 a hanger rail selectively securable to said hanger rail receiver and extending therefrom, wherein said drawbar includes an aperture, said hanger rail receiver includes an aperture;
 a fastener traversing said apertures formed in said hanger rail receiver and said drawbar to secure said hanger rail receiver to said drawbar; and
 a debris flap secured to said hanger rail and depending therefrom.

16. The combination of claim 15, wherein said fastener comprises a bolt.

17. The combination of claim 16, wherein said bolt comprises a j-shaped bolt.

18. The combination of claim 15, wherein said hanger rail receiver is positioned above said drawbar.

19. The combination of claim 15, further comprising a second fastener, wherein said drawbar further includes a second aperture and said hanger rail receiver further includes a second aperture, said second fastener traversing said second apertures formed in said drawbar and said hanger rail receiver to secure said hanger rail receiver to said drawbar.

20. In combination, a vehicle hitch apparatus and a debris flap for selective securement to the vehicle hitch apparatus, comprising:
 a vehicle hitch apparatus, comprising:
  a vehicle mounted hitch component;
  a ball mount; and
  a drawbar extending from said ball mount, said ball mount having a face opposite said drawbar;
 a hanger rail receiver secured to said face of said ball mount;
 a hanger rail selectively securable to said hanger rail receiver and extending therefrom; and
 a debris flap secured to said hanger rail and depending therefrom.

* * * * *